(12) United States Patent
Zheng et al.

(10) Patent No.: US 9,978,402 B2
(45) Date of Patent: May 22, 2018

(54) MAGNETIC HEAD, HARD DISK DEVICE, AND METHOD FOR TRANSFERRING TWO-DIMENSIONAL ATOMIC CRYSTAL LAYER TO HEAD SLIDER OF MAGNETIC HEAD

(71) Applicant: TSINGHUA UNIVERSITY, Beijing (CN)

(72) Inventors: Quanshui Zheng, Beijing (CN); Shoumo Zhang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days. days.

(21) Appl. No.: 15/255,105

(22) Filed: Sep. 1, 2016

(65) Prior Publication Data

US 2016/0372141 A1    Dec. 22, 2016

Related U.S. Application Data

(63) Continuation-in-part of application No. PCT/CN2014/075551, filed on Apr. 17, 2014.

(30) Foreign Application Priority Data

Mar. 18, 2014 (CN) .......................... 2014 1 0100304

(51) Int. Cl.
```
G11B 5/255      (2006.01)
G11B 5/31       (2006.01)
G11B 5/58       (2006.01)
C01B 32/186     (2017.01)
C01B 32/188     (2017.01)
```

(52) U.S. Cl.
CPC .......... *G11B 5/3106* (2013.01); *C01B 32/186* (2017.08); *C01B 32/188* (2017.08); *G11B 5/255* (2013.01); *G11B 5/581* (2013.01); *G11B 5/3163* (2013.01)

(58) Field of Classification Search
None
See application file for complete search history.

(56) References Cited

U.S. PATENT DOCUMENTS

| | | | | |
|---|---|---|---|---|
| 5,231,613 | A | * | 7/1993 | Nakayama et al. . G11B 33/148 360/235.2 |
| 2009/0301389 | A1 | * | 12/2009 | Samuelson et al. ... B82Y 30/00 117/88 |
| 2010/0025871 | A1 | * | 2/2010 | Lin et al. ............... B29D 11/00 264/1.37 |
| 2010/0061009 | A1 | * | 3/2010 | Watanabe ............ G11B 5/3106 360/122 |
| 2011/0151278 | A1 | * | 6/2011 | Gurney et al. ....... G11B 5/3106 427/127 |
| 2012/0281315 | A1 | * | 11/2012 | Schwappach et al. ..................... B24B 37/048 360/234.5 |
| 2015/0243594 | A1 | * | 8/2015 | Baillin et al. ..... H01L 21/76898 257/507 |
| 2016/0351436 | A1 | * | 12/2016 | Endean et al. ...... H01L 21/2007 |

* cited by examiner

*Primary Examiner* — Craig A. Renner
(74) *Attorney, Agent, or Firm* — Matthias Scholl, PC; Matthias Scholl

(57) ABSTRACT

A magnetic head includes a head slider. The head slider includes a contact surface corresponding to a disk body, and the contact surface is a flat surface. The contact surface is coated with at least one smooth atomic-scale coating formed by a two-dimensional atomic crystal material. The head slider atomically contacts with the disk body.

3 Claims, 3 Drawing Sheets

MAGNETIC HEAD, HARD DISK DEVICE, AND METHOD FOR TRANSFERRING TWO-DIMENSIONAL ATOMIC CRYSTAL LAYER TO HEAD SLIDER OF MAGNETIC HEAD

CROSS-REFERENCE TO RELATED APPLICATIONS

This application is a continuation-in-part of International Patent Application No. PCT/CN2014/075551 with an international filing date of Apr. 17, 2014, designating the United States, now pending, and further claims priority benefits to Chinese Patent Application No. 201410100304.5 filed Mar. 18, 2014. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, and Cambridge, Mass. 02142.

BACKGROUND OF THE INVENTION

Field of the Invention

The invention relates to a magnetic head, a hard disk device, and a method for transferring a two-dimensional atomic crystal layer to a head slider of the magnetic head.

Description of the Related Art

Existing hard disk device includes a magnetic head and a disk body which are mutually contacted. This leads to a friction between the magnetic head and the disk body when reading and writing. When the magnetic head and the disk body are coated with identical atomic-scale coating materials, during the reading process, the coating materials tend to abrade, and the hard disk device often becomes damaged.

SUMMARY OF THE INVENTION

In view of the above-described problems, it is one objective of the invention to provide a magnetic head of a hard disk, a hard disk device, a method for a transferring two-dimensional atomic crystal layer on a head slider magnetic head, and a method for preparing the head slider. When the magnetic head is reading or writing, the magnetic head atomically contacts with the disk body, and the magnetic head and the disk body are in a superlubric state.

Atomic contact means that almost no impurities exist between two smooth atomic-scale surfaces which are parallel and no chemical bonds are formed between the atoms contact with each other, and the two surfaces are connected through van der Waals force. Superlubric state means that almost no friction is produced during the relative movement of the two surfaces.

To achieve the above objective, in accordance with one embodiment of the invention, there is provided a magnetic head of a hard disk, comprising a head slider. The head slider comprises a contact surface corresponding to a disk body, and the contact surface is a flat surface. The contact surface is coated with at least one smooth atomic-scale coating formed by two-dimensional atomic crystal material. When the magnetic head is reading, the magnetic head atomically contacts with the disk body. When a balance of the atomic contact is achieved, the van der Waals force is at a minimum interaction potential.

In a class of this embodiment, the coating on a bottom surface of the head slider is extended to a side surface of the head slider so that the friction between the head slider and the disk body is further reduced.

In a class of this embodiment, the two-dimensional atomic crystal material is graphene, boron nitride, boron carbon nitride (BCN), fluorinated graphene, graphene oxide, $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, GaSe, GaTe, InSe, $Bi_2Se_3$, mica, bismuth strontium calcium copper oxide (BSCCO), $MoO_3$, $WO_3$, $TiO_2$, $MnO_2$, $V_2O_5$, $TaO_3$, $RuO_2$, $LaNb_2O_7$, $(Ca, Sr)_2Nb_3O_{10}$, $Bi_4Ti_3O_{12}$, $Ca_2Ta_2TiO_{10}$, $Ni(OH)_2$, $Eu(OH)_2$, or layered copper oxide.

Preferably, the two-dimensional atomic crystal material as the coating of the head slider is graphene.

Preferably, a length and width of the head slider is between 0.1 and 1000 μm.

Preferably, a length and width of the head slider is between 10 and 1000 μm.

A hard disk device comprises the magnetic head and the disk body. The disk body comprises a magnetic media layer and at least one protection layer disposed on the magnetic media layer. The protection layer comprises a smooth atomic-scale surface formed by two-dimensional atomic crystal material or diamond-like carbon nanofilm.

Preferably, the protection layer comprises the diamond-like carbon nanofilm to form the smooth atomic-scale surface.

Preferably, the two-dimensional atomic crystal material used by the protection layer is graphene, boron nitride, boron carbon nitride (BCN), fluorinated graphene, graphene oxide, $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, GaSe, GaTe, InSe, $Bi_2Se_3$, mica, bismuth strontium calcium copper oxide (BSCCO), $MoO_3$, $WO_3$, $TiO_2$, $MnO_2$, $V_2O_5$, $TaO_3$, $RuO_2$, $LaNb_2O_7$, $(Ca, Sr)_2Nb_3O_{10}$, $Bi_4Ti_3O_{12}$, $Ca_2Ta_2TiO_{10}$, $Ni(OH)_2$, $Eu(OH)_2$, or layered copper oxide.

Because the contact surfaces of the magnetic head and the disk body (the coating of the magnetic head and the protection layer of the disk body) both are optionally made from the two-dimensional atomic crystal material, when the surfaces of the magnetic head and the disk body use the same coating material, friction is possibly produced due to a possible commensurate stacking. Thus, one solution is that the coating of the magnetic head and the protection layer of the disk body use different materials. However, when the coating of the magnetic head and the protection layer of the disk body use the same material:

Preferably, the head slider is provided with an actuator to change the size of crystal cells of the two-dimensional crystal.

Preferably, the actuator is a heat emitting device, a piezoelectric device, or a vibration device.

Preferably, the actuator is piezoelectric ceramic which enables the head slider to constantly vibrate transversely.

Preferably, the hard disk device further comprises a control device. The control device comprises a detection device. The control device actuates the actuator prior to the operation of a read-write device; and during the reading and writing process of the read-write device, the actuator is actuated when two-dimensional materials of the coating of the magnetic slider and the protection layer are incommensurately arranged, and an incommensurate arrangement is detected by the detection device.

A method for transferring the two-dimensional atomic crystal layer to the head slider, the method comprising:

a. growing the two-dimensional atomic crystal layer on a first matrix;

b. coating a second matrix on the two-dimensional atomic crystal layer, and forming a bonding layer between the second matrix and the two-dimensional atomic crystal layer;

c. bonding the two-dimensional atomic crystal layer to the head slider to form the coating of the head slider; and d. washing away the second matrix and removing the bonding layer to yield the head slider with the two-dimensional atomic crystal layer.

Preferably, prior to step c, a surface of the head slider which is bonded with the two-dimensional atomic crystal layer in step c is polished to be a smooth atomic-scale surface.

Preferably the step c comprises removing the first matrix and changing the size of crystal cells of the two-dimensional atomic crystal layer. Then the two-dimensional atomic crystal layer having changed crystal cells is bonded to the head slider.

Preferably, after the step d, the size of crystal cells of the two-dimensional atomic crystal layer is changed.

Preferably, the size of crystal cells of the two-dimensional atomic crystal layer is changed through a deformation of the head slider.

Preferably, the head slider is provided with piezoelectric ceramic so that the head slider constantly vibrates transversely.

A method for preparing the head slider, comprising:

a. allowing two-dimensional crystal material to epitaxially grow on a smooth atomic-scale metal matrix, where the metal matrix and the two-dimensional material have different lattice constants;

b. integrating the two-dimensional crystal material on the metal matrix and the metal matrix to prepare the head slider;

c. positioning the head slider on a magnetic head.

Preferably, prior to step a, the metal matrix is prepared according to the length and width of the head slider.

Preferably, after the step a, the two-dimensional crystal material on the metal matrix and the metal matrix are cut as a whole to the length and width of the head slider.

Advantages of the magnetic head, the hard disk device, and the method for transferring two-dimensional atomic crystal layer to the head slider according to embodiments of the invention are summarized as follows:

Compared with conventional head slider which has a complex graphical design on the surface, the head slider in the invention has a smooth bottom surface. The bottom surface of the head slider is coated with the two-dimensional atomic crystal layer to form a smooth atomic-scale surface. When the magnetic head is reading or writing, the magnetic head atomically contacts with the disk body, and the magnetic head and the disk body are in a superlubric state, which means that approximately no friction is produced between the head slider and the disk body. This is obviously different from reading and writing technologies in the prior art. After the head slider atomically contact the disk body, the distance from the head slider to the disk body is greatly decreased, meanwhile, in terms of the features of the two-dimensional atomic crystal material, the diamond-like carbon protection layer of the conventional head slider is replaced so as to reduce the thickness of the protection layer and further decrease the distance from the head slider to the disk body, which improves the storage density of the disk. In addition, complex graphical surface of the head slider is abandoned in the invention, thus the head slider features simple structure. Because the magnetic head and the disk body are in the superlubric state, in operation the stability of the disk is enhanced, and the hard disk device is ensured to be small-sized.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a magnetic head, a hard disk device, and a method for transferring two-dimensional atomic crystal layer to a head slider of the magnetic head are described below. It should be noted that the following examples are intended to describe and not to limit the invention.

A magnetic head structure is provided in the invention. The complex graphical surface of the head slider is replaced by a smooth bottom surface, and the bottom surface of the head slider is always parallel to a top surface of the disk body. The bottom surface of the head slider is polished to form a smooth atomic-scale surface. Then the two-dimensional atomic crystal material (such as graphene) is transferred to or grows on the bottom surface of the head slider, and the bottom surface is coated with at least one layer of the two-dimensional atomic crystal material (such as graphene). The coating on the bottom surface of the head slider is extended to a side surface of the head slider so as to avoid scratches on the disk body caused by the side surface and avoid the friction caused by the bonding between the dangling bonds on the edge of the coating and the dangling bonds on the surface of the disk body.

The head slider atomically contacts with the disk body, and the magnetic head and the disk body are in a superlubric state, thus approximately no friction is produced, and only minor or no abrasion exists between the head slider and the disk body. In other words, in operation, because the bottom surface of the head slider always atomically contacts with the top surface of the disk body, and the disk body and the magnetic head are not damaged thereby, a contact between the head slider and the disk body during the reading and the writing process is achieved. Thus, compared with conventional hard disk, the distance from the head slider to the disk body in the invention is greatly decreased. Meanwhile, the head slider is provided with two-dimensional atomic crystal material (such as graphene) which is used as a substitution for conventional diamond-like carbon protection film, thereby reducing the thickness of the protection film.

Figure 1:
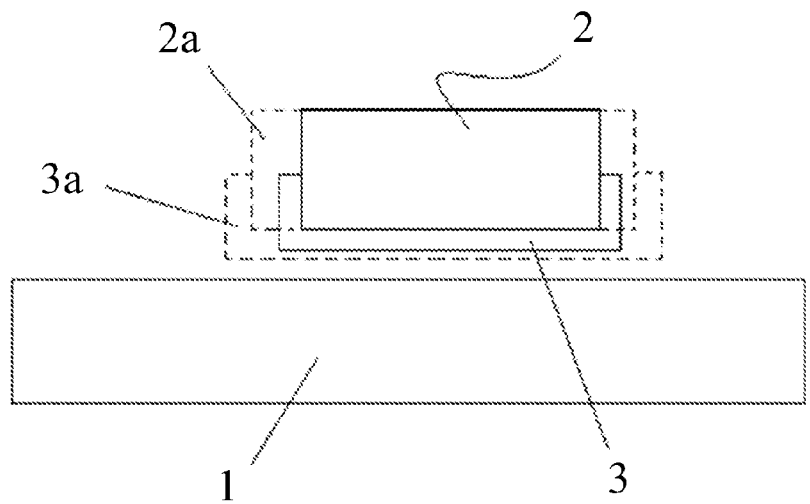
FIG. 1 is a schematic diagram of a head slider and a disk body of a hard disk device.

FIG. 1 is a schematic diagram of the head slider and the disk body of a hard disk device. The head slider 2 comprises a contact surface corresponding to a disk body 1, and the contact surface is a flat surface. The complex graphical surface of the head slider is simplified to be a flat surface in the invention. The magnetic head atomically contacts with the disk body, and the atomic contact means that two smooth atomic-scale surfaces which are parallel having approximately no other impurity between the surfaces and no chemical bonds formation of the atoms contact with each other under the effect of intermolecular force (the van der Waals force).

When two smooth atomic-scale surfaces contact with each other, as the distance becomes smaller, the van der Waals force changes from an attractive force to a repulsive force, and at a certain distance, the attractive force and the repulsive force are balanced; when the balance is achieved, a van der Waals force is at the minimum interaction potential. All these belong to the common general knowledge in this field.

The contact surface is the surface of the head slider 2 adapted to contact the disk body 1. The contact surface of the head slider 2 is coated with at least one layer of the two-dimensional atomic material to form a smooth atomic-scale coating 3. The coating 3 is single crystal graphene or other two-dimensional atomic crystals. The two-dimensional atomic crystals are layered two-dimensional materials, having only one or a few atoms in the thickness direction. During the reading process, the head slider 2 always atomically contact the disk body 1. The two-dimensional atomic crystals (such as graphene) forms the smooth atomic-scale surface, which means that on a crystal surface of the crystal material, no atomic-scale step exists. The two-dimensional atomic crystal material is graphene, boron nitride, boron carbon nitride (BCN), fluorinated graphene, graphene oxide, $MoS_2$, $WS_2$, $MoSe_2$, $WSe_2$, $MoTe_2$, $WTe_2$, $ZrS_2$, $ZrSe_2$, $NbSe_2$, $NbS_2$, $TaS_2$, $TiS_2$, $NiSe_2$, GaSe, GaTe, InSe, $Bi_2Se_3$, mica, bismuth strontium calcium copper oxide (BSCCO), $MoO_3$, $WO_3$, $TiO_2$, $MnO_2$, $V_2O_5$, $TaO_3$, $RuO_2$, $LaNb_2O_7$, $(Ca, Sr)_2Nb_3O_{10}$, $Bi_4Ti_3O_{12}$, $Ca_2Ta_2TiO_{10}$, $Ni(OH)_2$, $Eu(OH)_2$, or layered copper oxide.

Preferably, the coating of the head slider is graphene. Graphene is a single layer of carbon atoms that are bonded together in a two-dimensional hexagonal honeycomb lattice. As an allotrope of carbon, graphene is in the structure of a plane of $sp^2$ orbital hybridization. In addition, graphene is the thinnest nanomaterial at one atom thick yet the strongest nanomaterial discovered in the world. The head slider with the graphene coating is applied to the hard disk, and the head slider atomically contacts with the surface of the disk body. The magnetic head and the disk body are in a superlubric state, thus approximately no friction is produced, and only minor or no abrasion exists between the head slider and the disk body. In other words, in operation, because the bottom surface of the head slider always atomically contacts with the top surface of the disk body, and the disk body and the magnetic head are not damaged thereby, a contact between the head slider and the disk body during the reading and the writing process is achieved.

During the reading process, the graphene layer or other two-dimensional atomic crystal layer coated on the bottom surface of the head slider 2 is extended to a side surface of the head slider so as to avoid scratches on the disk body caused by the side surface and avoid the friction caused by the bonding between the dangling bonds on the edge of the coating (the graphene layer or other two-dimensional atomic crystal layer) and the dangling bonds on the surface of the disk body.

The head slider 2 has a feature size between 0.1 and 1000 μm (length and width). The coating 3 is adjusted according to the size the head slider, i.e. the size between 0.1 and 1000 μm mentioned above. Because the head slider 2 atomically contacts with the disk body 1, the head slider 2 exerts a positive pressure on the disk body 1 which tends to damage the surface of the disk body. To avoid the damage, the head slider 2 has a size between 10 and 1000 μm, and is called a large-size head slider, correspondingly, the graphene layer or other two-dimensional atomic crystal layer on the head slider is required to be relatively large in size.

The graphene is prepared by a method of chemical vapor deposition (CVD). The CVD method uses organic gases (such as methane, ethylene), liquid (such as ethyl alcohol), or solid material (such as camphor, sucrose) as raw material to prepare the graphene. And the devices used by the CVD to prepare the graphene comprise a resistance furnace as a major part, and a quartz tube as a reaction chamber. Ethyl alcohol (for example) is employed as the carbon source, and a metal foil (i.e. copper foil) is employed as the substrate. A reaction solution is driven by a precise flow pump, and input into the reaction chamber via a capillary tube. The carbon source is decomposed to form antiatom at a high temperature reaction zone and deposits at the metal substrate to prepare a continuous graphene film. Then the large-size graphene is transferred to the surface of the head slider to form a smooth atomic-scale surface on the head slider.

Figure 2:
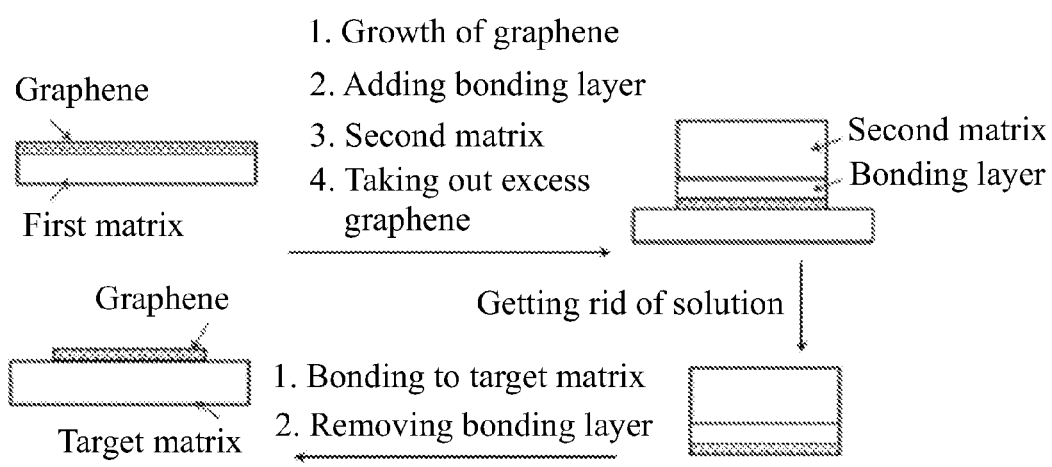
FIG. 2 is a flow chart of a method for transferring a two-dimensional atomic crystal layer.

FIG. 2 is a flow chart of a method for transferring two-dimensional atomic crystal layer to the head slider, and a method for transferring graphene to the head slider is taken as an example. The method comprises the following steps: a. single crystal graphene grew on a first matrix for growing graphene; b. a second matrix for transferring graphene was compressed on a surface of the graphene to form a bonding layer with high adhesive strength, where the second matrix was polymers such as polymethyl methacrylate (PMMA) and polydimethylsiloxane (PDMA); c. the first matrix was removed using a solution (i.e. ferric chloride solution); d. the single crystal graphene on the second matrix was adhered to the head slider (target matrix); the single crystal graphene covered a bottom surface of the head slider and was extended to the side surface of the head slider; the second matrix and the bonding layer on the surface of graphene were removed by an organic solution (such as acetone). Thus, the smooth atomic-scale surface made from single crystal graphene was formed on the bottom surface and part of the side surface of the head slider.

In terms of the large-size head slider having a size between 10 and 1000 μm, large-size two-dimensional atom crystals are required to grow on or be transferred to the surface of the large-size head slider, taking the growth of large-size single crystal graphene on the head slider as an example:

A method of chemical vapor deposition (CVD) is used for growing the large-size single crystal graphene on the head slider. The synthesis of the large-size single crystal graphene (~5 mm) used copper as the catalyst, and the CVD was performed at low pressure. A mixed gas comprising argon, hydrogen, and diluted methane (500 p.p.m methane balanced in argon atmosphere) was employed, where the methane was the carbon source of the graphene. Copper sheet with a thickness of 25 μm was washed using aqueous hydrochloric acid solution (a ratio of HCL to $H_2O$ was 1:10), after that, the copper sheet was washed three times using isopropanol, then the copper sheet was dried in nitrogen atmosphere. The dry copper sheet was placed in a CVD high-temperature tube furnace, and the diameter of the reacting quartz tube was one feet. Air in the tube furnace was extracted for 30 min to form a 10 mTorr vacuum environment. 300 sccm of pure nitrogen or a mixed gas of nitrogen and hydrogen was introduced to the quartz tube. The quartz tube was heated for 25 min (the quartz tube was heated in the first 20 min, and then the temperature was stabilized for 5 min), and the temperature reached 1070° C. Diluted gaseous methane and hydrogen were introduced to the quartz tube and the graphene grew at 1070° C., where a molar ratio of the hydrogen to the gaseous methane was 1320-8800, and the pressure was between 1 and 1000 mbr. The growth of the graphene was ended by quenching the quartz tube and cooling to a room temperature (the cooling rate was 200° C./min)

A wet etching method is used for transferring the large-size single crystal graphene to the large-sized head slider. The method employed copper sheet as the substrate. During the growth of the graphene, the graphene grew on both surfaces of the copper sheet. One surface of the copper sheet was coated with polymethyl methacrylate (PMMA), and was roasted for 2 min at 120° C., and the other surface of the copper sheet was exposed to $O_2$ plasma for 60 min to remove the graphene on the surface. After that, the copper sheet was corroded using a copper corrosive agent to yield a PMMA/graphene film which is freely suspended over the surface of the copper corrosive agent. The PMMA/graphene film was washed using a mixed solution of HCL and deionized water (a ratio of HCL to deionized water is 1:10), then was washed by deionized water for several times, and transferred to the large-size head slider. The film covered the bottom surface and the side surface of the head slider, and dried in air. The PMMA was dissolved using acetone, and the substrate was washed by isopropanol, thus finally the graphene was transferred from the copper sheet to the large-sized head slider.

The disk body 1 of the hard disk is a medium of magnetic recording. The base of the disk body is a glass disk or an aluminum disk having a superlubric surface (the RMS roughness is 0.2 nm). Two side surfaces of the disk body are provided with a plurality of coatings. Data of the hard disk is stored in a magnetic layer with a thickness of about 30 nm. The magnetic layer of a conventional disk body is coated with the diamond-like carbon (DLC) layer with a thinness between 1 and 3 nm to protect the magnetic layer from abrasion and corrosion, and the DLC layer is provided with a lubricant layer with a thickness between 1 and 2 nm to improve the abrasion resistance of the DLC layer.

The head slider in the invention comprises a contact surface, and the contact surface is coated with at least one layer of graphene or other two-dimensional atomic crystal material. During the operation of the hard disk, the contact surface of the head slider atomically contacts with the surface of the disk body. The distance of the atomic contact tends to change because of gravity and vibration, yet the change is impossible to cause damage to the contact surface or cause departure in the invention.

Figure 3:
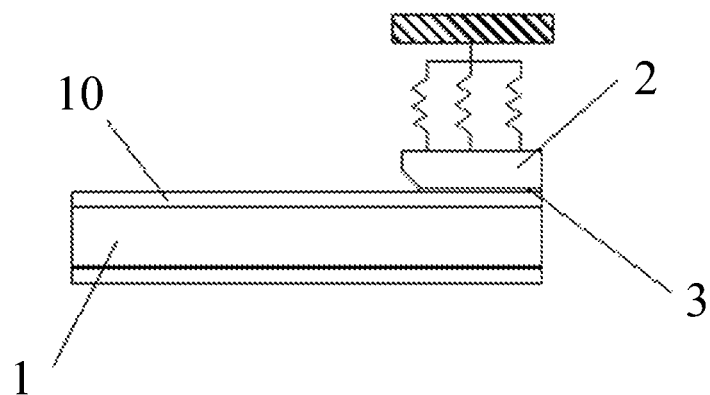
FIG. 3 is a schematic diagram of a head slider and a disk body in accordance with one embodiment of the invention.
Figure 4:
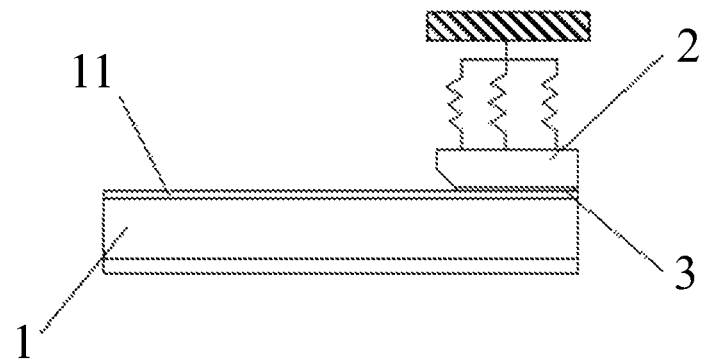
FIG. 4 is a schematic diagram of a head slider and a disk body in accordance with another embodiment of the invention.

As shown in FIG. 3, optionally, the protection layer of the disk body 1 used conventional diamond-like carbon (DLC) layer 10, and the lubricant layer on the original DLC layer 10 was removed. The head slider 2 atomically contacted the DLC layer 10 on the disk body, and the magnetic head and the disk body were in a superlubric state, thus approximately no friction was produced, and only minor or no abrasion existed between the head slider and the disk body. Optionally, the protection layer used the two-dimensional atomic crystal material to form a smooth atomic-scale surface. The head slider 2 and the disk body 1 used different two-dimensional atomic crystal materials, and the magnetic head and the disk body were in a superlubric state, thus approximately no friction was produced, and only minor or no abrasion existed between the head slider and the disk body. However, when the head slider 2 and the disk body 1 use the same two-dimensional atomic crystal material, once the two-dimensional layers are commensurately arranged during the mutual movement of contact surfaces of the head slider 2 and the disk body 1, the superlubric state of the head slider and the disk body ends.

For example, the head slider 2 and the disk body 1 both used graphene. The graphene layer 11 directly grew on or was transferred to the magnetic media layer to form a smooth atomic-scale surface. During the reading process, the head slider 2 atomically contacts with the disk body 1, as an upper surface of the disk body 1 and the bottom surface of the head slider 2 both uses the graphene, when the upper surface of the disk body 1 and the bottom surface of the head slider 2 are incommensurately arranged, the magnetic head and the disk body were in a superlubric state, thus approximately no friction was produced, and only minor or no abrasion existed between the head slider and the disk body.

Figure 5A:
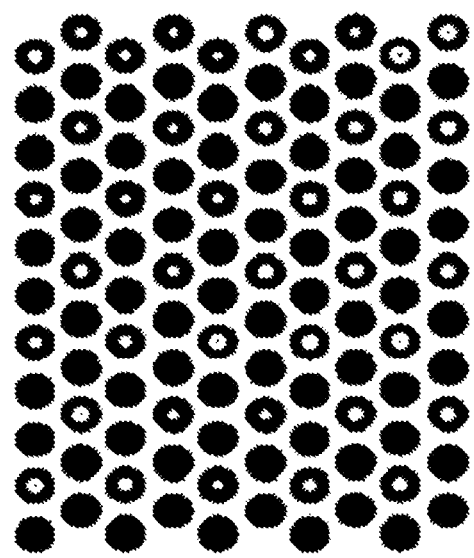
FIGS. 5A, 5B, and 5C are diagrams showing three different ways of stacking of smooth atomic-scale surfaces.
Figure 5B:
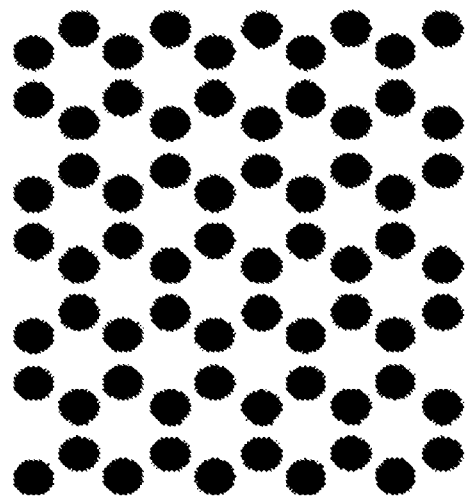
Figure 5C:
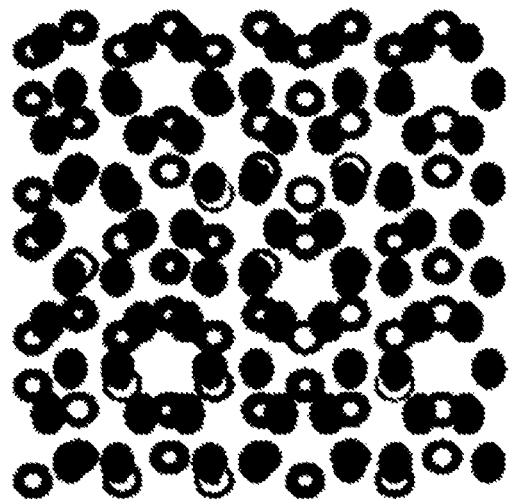

The graphene has a hexagonal lattice structure, and the graphene layers are stacked in various ways, among which an AB stacking generates minimum energy, as shown in FIG. 5A. The black spot atoms and the annular ring atoms each form a graphene layer. Half of the atoms on a first layer are coincident with the atoms on the second layer, and the other half of atoms on the first layer are in the centers of the hexagonal lattices of atoms on the second layer. As shown in FIG. 5B, besides the AB stacking, the AA stacking also partially generates little binding energy. The AA stacking ensures the atoms on two layers are completely coincident. The AA stacking is turned out by parallelly shifting the AB stacking. As shown in FIG. 5C, the two layers of atoms are relatively rotated, causing the lattice orientations to mismatch except that the rotation angle is the integral multiple of 60 degrees. This way of stacking ensures that the fluctuation of binding energy between the graphene layers when the graphene layers are parallelly shifting is curbed, thereby presenting a subdued potential energy surface. The way of stacking in FIG. 5C is called incommensurate stacking, and the AB stacking and AA stacking are called commensurate stacking. The ways of stacking have an impact on the friction between layers of single layer graphene. Compared with the commensurate stacking, the incommensurate stacking has restrained potential energy fluctuation when the graphene layers are parallelly shifting, thus the incommensurate stacking produces smaller friction. As the graphene layers are stacked in an incommensurate way, the structure is in a superlubric state when layers are parallelly shifting, thus approximately no friction was produced, and only minor or no abrasion existed between the head slider and the disk body.

Preferably, the graphene layers are incommensurately arranged, and the graphene layers are in a superlubric state, thus approximately no friction was produced, and only minor or no abrasion existed between the head slider and the disk body.

To avoid the friction caused by the commensurate stacking of graphene layers, the head slider is provided with an actuator to reshape or rotate the head slider, and the graphene on the head slider is processed.

1) A heating equipment (heat emitting device) was disposed inside the head slider to reshape the head slider. The graphene on the head slider was stretched following the head slider, and the size of crystal cells of the graphene was changed. The stretch of the graphene caused the lattices of graphene on head slider to mismatch the lattices of graphene on an upper surface of the disk body, thus the graphene layers were incommensurately arranged, and approximately no friction was produced. As shown in FIG. 1, under the effect of the heat emitting device, the head slider 2 was reshaped and the graphene on the head slider was stretched to form the final head slider 2a and the final graphene layer 3a.

2) A mechanical device (piezoelectric device) was disposed inside the head slider to reshape the head slider. The graphene on the head slider was stretched following the head slider, and the size of crystal cells of the graphene was changed. The stretch of the graphene caused the lattices of graphene on head slider to mismatch the lattices of graphene on an upper surface of the disk body, thus the graphene layers were incommensurately arranged, and approximately no friction was produced. For example, the head slider is provided with piezoelectric ceramic which enables the bottom surface of the head slider to vibrate transversely, so as to avoid the commensurate arrangement of the graphene layers on the bottom surface of the head slider and on the upper surface of the disk body. Meanwhile, the piezoelectric device also enables the head slider to vibrate transversely, so as to change the size of crystal cells of the graphene layer on the head slider at any time and avoid the friction caused by the commensurate stacking of graphene layers.

Optionally, the stretch of the graphene layer is conducted before the graphene layer is transferred to the head slider. For example, after the removal of the first matrix for growing graphene, the size of crystal cells of the graphene layer is changed using methods in the prior art, then the graphene layer having changed size of crystal cells is bonded to the head slider. Or the size of crystal cells of the graphene is changed after the graphene layer is bonded to the head slider.

Optionally, the stretch of the graphene layer is conducted during the reading process. The hard disk device comprises a control device. The control device comprises a detection device (to detect the shear strength between the head slider and the disk body). During the reading and writing process, when the detection device detects a commensurate stacking of graphene layers, the actuator is actuated to change the size of crystal cells of the graphene, and eventually the graphene layers are incommensurately arranged, thus achieving a real-time monitor and adjustment during the reading and writing process. Optionally, the control device actuates the actuator prior to the operation of a read-write device, and the graphene layers of the head slider and the disk body are incommensurately arranged.

To avoid the commensurate stacking of graphene layers, a method for preparing the head slider is provided, comprising:

a. allowing two-dimensional crystal material to epitaxially grow on a smooth atomic-scale metal matrix, where the metal matrix and the two-dimensional material have different lattice constants;

b. integrating the two-dimensional crystal material on the metal matrix and the metal matrix to prepare the head slider;

c. positioning the head slider on a magnetic head.

Preferably, prior to step a, the metal matrix is prepared according to the length and width of the head slider.

Preferably, after the step a, the two-dimensional crystal material on the metal matrix and the metal matrix are cut as a whole to the length and width of the head slider.

Because the two-dimensional material on the head slider of the method and the matrix for growing the two-dimensional material have different lattice constants, lattice mismatch happens during the growth of the two-dimensional material, causing the lattice of the two-dimensional crystal on the head slider to mismatch the lattice of the corresponding two-dimensional crystal on the disk body, thus the commensurate stacking phenomenon is avoided.

Advantages of the magnetic head, the hard disk device, and the method for transferring two-dimensional atomic crystal layer on the head slider according to embodiments of the invention are summarized as follows:

1. Compared with the complex design of the conventional head slider, the design of the head slider surface in the invention is simplified.

2. As the bottom surface of the head slider and the upper surface of disk body are incommensurately arranged, the head slider and the disk body are in a superlubric state, and only minor or no abrasion exists between the head slider and the disk body during the reading process. The distance from the read-write device of the magnetic head to the disk body is decreased, correspondingly, the storage density of the disk is improved, and an atomic contact during reading and writing process is achieved.

3. A high rotational speed of the hard disk is achieved easily, thus the data read-write speed of the hard disk is increased.

4. Compared with the conventional hard disks which have poor shockproof performance and other limitations, the stability of the hard disk in the invention is greatly enhanced.

5. Due to the simplified design, the stability and the storage capacity of the hard disk are greatly improved. The size of the hard disk is sharply reduced while the storage capacity remains the same.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

Numbers in the drawings refer to corresponding elements in the invention. Some of the lines, layers, elements, or characteristics are amplified in the drawings to clarify the invention.

The terms in the examples are intended to describe and not to limit the invention. Unless otherwise defined, the terms in the invention (including technical terms and scientific terms) have typical meanings in this field.

The invention claimed is:

1. A hard disk device, comprising:
   a disk body;
   a magnetic head comprising a head slider having a contact surface corresponding to the disk body;
   wherein:
   the contact surface is a flat surface;
   the contact surface is coated with at least one atomic-scale smooth coating that is formed by a two-dimensional atomic crystal material;
   the disk body comprises a coating of at least one protection layer, and the protection layer comprises an atomic-scale smooth surface that is formed by a two-dimensional atomic crystal material or diamond-like carbon nanofilm;
   the head slider atomically contacts with the disk body; and
   when the magnetic head is reading data, the magnetic head atomically contacts with the disk body under an effect of van der Waals force; when a balance of an atomic contact is achieved, the van der Waals force is at a minimum interaction potential.

2. A hard disk device, comprising:
   a disk body;

a magnetic head comprising a head slider having a contact surface corresponding to the disk body;

wherein:

the contact surface is an atomic-scale smooth surface;

the contact surface is coated with at least one atomic-scale smooth coating that is formed by a two-dimensional atomic crystal material to result in an atomic-scale smooth head surface;

the disk body comprises a coating of at least one protection layer;

the protection layer comprises an atomic-scale smooth disk surface that is formed by a two-dimensional atomic crystal material or diamond-like carbon nano-film;

the atomic-scale smooth head surface is parallel to the atomic-scale smooth disk surface; and when in use, the atomic-scale smooth head surface atomically contacts with the atomic-scale smooth disk surface.

3. The magnetic head of claim 2, wherein the head slider comprises a side surface which is coated by the atomic-scale smooth coating.

* * * * *